United States Patent [19]

Browne et al.

[11] Patent Number: 5,716,143
[45] Date of Patent: Feb. 10, 1998

[54] SPHERICAL PLAIN BEARING

[75] Inventors: Timothy M. Browne, Aspinwall; Jeffrey C. Badac, New Kensington; J. David Scott, Pittsburgh; Robert M. Suchevich, Lower Burrell; Joseph A. Downie, Aliquippa, all of Pa.

[73] Assignee: Allegheny Ludlum Corporation, Pittsburgh, Pa.

[21] Appl. No.: 501,965

[22] Filed: Jul. 12, 1995

[51] Int. Cl.$^6$ .................. F16C 23/04; F16C 33/22
[52] U.S. Cl. ............... 384/192; 384/275; 384/282; 384/284; 384/297
[58] Field of Search ................ 384/192, 280, 384/281, 282, 284, 285, 297, 416, 420

[56] References Cited

U.S. PATENT DOCUMENTS 5,549,394  8/1996  Nowak et al. ................ 384/282

Primary Examiner—Thomas R. Hannon
Attorney, Agent, or Firm—Patrick J. Viccaro; Robert J. Pugh

[57] ABSTRACT

A spherical plain bearing is provided having improved wear resistance under heavy axial and radial loads of a rotating shaft. The bearing includes a pillow block having a concave inner surface, a split cylindrical protective sleeve for mating with and detachably clamping around the shaft, the outer surface of the sleeve having a peripheral recess. The bearing includes a split cylindrical liner having an inner wear resistant surface for sliding contact within the recess of the protective sleeve, and multiple thrust plate rings, and a split cylindrical cartridge for holding the liner in the recess of the protective sleeve. The bearing includes a plurality of high wear-resistant elements for providing high wear resistance and low friction resistance when placed into the wear surfaces of the bearing.

8 Claims, 1 Drawing Sheet

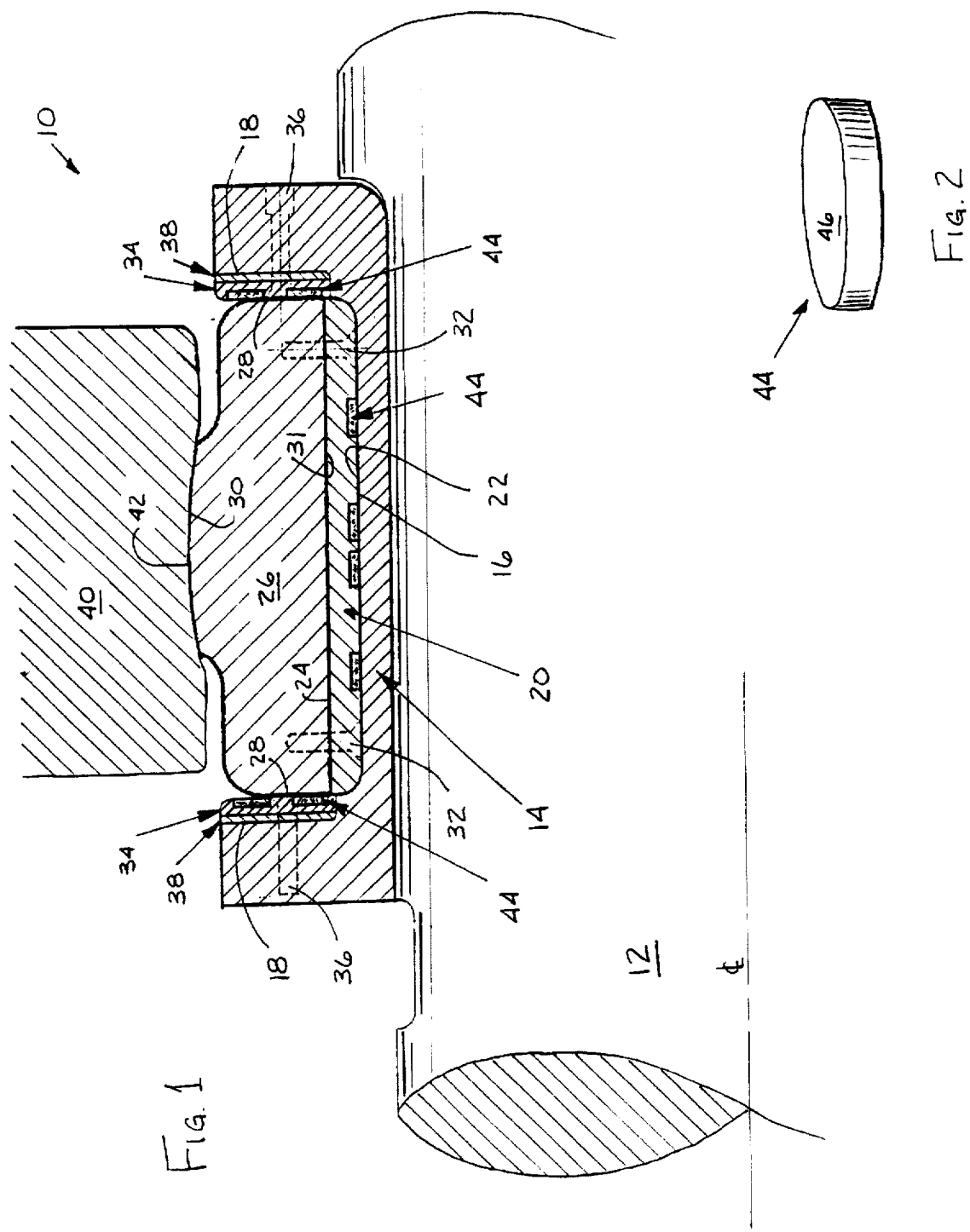

SPHERICAL PLAIN BEARING

FIELD OF INVENTION

This invention relates to a spherical plain bearing. Particularly, the invention relates to a spherical plain bearing having improved wear resistance under heavy loads and low-speed rotation.

BACKGROUND OF THE INVENTION

In the metals industry, large vessels are used for melting and refining molten metal. Such vessels may range in size from 10 to over 100 tons, for example. The vessels are typically supported on trunnions or journals on opposite sides of the vessel which are, in turn, supported by bearings. The bearings permit the vessels to be tilted about the trunnions or journals such as for loading a metal charge and unloading molten metal. For example, argon-oxygen decarburization vessels (AOD) and basic oxygen furnaces (BOF) are supported by trunnions through bearings which are under heavy radial and axial loads as well as low-speed rotation. As a result of metal charging procedures which add scrap metal and molten metal to the vessels, and the refining processes which inject high velocity gases into such vessels, the AOD or BOF vessels may sway and shake in a manner which adds further load to the bearings.

Generally, a trunnion bearing of a large vessel is subject to three interactions which may be called rotation, thrust, and articulation (or alignment). These interactions are complicated by impact loading and surface stress resulting from operations with the vessel.

There are many known bearing designs which have been used to support molten metal vessels. Such designs include spherical roller bearings which may or may not include split-ring designs. While roller designs generally have lower friction loads than sliding bearings, roller designs may have 1000 times the surface loads. As a result, spherical roller designs, even when properly lubricated and maintained can fail in fatigue without warning. The result of such failures can be catastrophic with unplanned outages which significantly lower production, tonnage, and yields. Also as a result, the cost of repair can be high, depending on the equipment damage, the length of delay, and the cost of the parts to be replaced.

Generally, plain bearings with sliding elements can provide better impact loading resistance than roller bearing designs. A variety of materials may be used, such as bronze, iron, babbitt, and molded fibers, to absorb impact and aid in lubricity of the bearing.

It is also known to use spherical plain bearings using a polytetrafluoroethylene (PTFE) glass fiber composite on the outer surface of the inner ring of the plain bearing. The contact surfaces are machined to a spherical surface to match a spherical contact surface on an outer ring inner surface. Such a design adds significantly to machining costs for the bearing.

A newer class of bearing materials is available which has improved lubricity and the ability to "sacrifice" for the contacting moving elements. Such materials include graphite, polyimide, polyamide, nylon, and PTFE.

In view of such failures and problems with prior known bearing designs, what is needed is a large spherical plain bearing design that will withstand heavy radial and axial loads as well as wear slowly and predictably. The bearing design should be capable of supporting both the dead weight of the vessel and molten metal as well as dynamic loads as a result of motion of the vessel. There is also a need for a bearing having component parts which are easier and less expensive to fabricate as well as easier to remove and repair in the event of failure. The bearing should also have improved wear resistance and the amount of wear should be measurable in order to permit operators to plan equipment shutdowns in order to make repairs.

SUMMARY OF THE INVENTION

In accordance with the present invention, a spherical plain bearing is provided having improved wear resistance under heavy axial and radial loads of a rotating shaft. The bearing comprises a pillow block, a cylindrical protective sleeve, a cylindrical liner, multiple thrust plate rings, a cylindrical cartridge, and a plurality of high wear-resistant elements being press-fit into the wear surfaces of the bearing. The cylindrical protective sleeve meets with and detachably clamps around the shaft of the workpiece. The outer surface of the sleeve also has a peripheral recess defined by two sidewall wear surfaces and a bottom wear surface. The cylindrical liner has an inner wear-resistant surface for sliding contact with the bottom wear surface of the recess of the sleeve. At least one of the thrust plate rings is detachably secured to each sidewall of the recess of the sleeve. The cylindrical cartridge is detachably secured to the inner surface of the liner. The cartridge has an outer surface being a spherical segment to contact with the matching concave surface of the pillow block. The plurality of high wear-resistant elements consist essentially of high carbon fiber composites for providing high wear and low friction resistance. Preferably, the sleeve, liner, and cartridge are of a split ring design.

BRIEF DESCRIPTION OF THE DRAWINGS

FIG. 1 is a partial cross section of a spherical plain bearing of the present invention.

FIG. 2 is a perspective view of a high wear-resistant disc component of the bearing of the present invention.

DETAILED DESCRIPTION OF THE PREFERRED EMBODIMENTS

FIG. 1 generally illustrates a spherical plain bearing 10 of the present invention adjacent a trunnion, journal, or shaft 12. The bearing 10 comprises a protective sleeve 14 having therein thrust ring 34, a liner 20, and a cartridge 26 in contact with an upper pillow block 40. FIG. 1 illustrates in partial cross section only the upper half of the bearing of the present invention. The lower half is not shown. As used herein, trunnion, journal, and shaft may be used interchangeably.

Protective sleeve 14 comprises a cylindrical member which extends completely around the journal 12 periphery. The protective sleeve may be a unitary member or, preferably, may be split into two or more pieces in order to facilitate easy application and removal from the journal 12. Sleeve 14 may be detachably clamped or fastened to journal 12 in a conventional manner (not shown).

The protective sleeve 14 includes a peripheral recess which extends completely around the periphery of journal 12 when protective sleeve 14 is clamped in place. The recess is defined by a bottom wear surface 16 and two sidewall wear surfaces 18.

Protective sleeve 14 may be made of various materials. Preferably, sleeve 14 is made of metal, such as a high strength low alloy material. It may be a one-piece design, but preferably, sleeve 14 is of a split cylindrical design.

Liner 20 is also a cylindrical member, having an inner wear surface 22 and an outer surface 24. Liner 20 is placed within the recess of protective sleeve 14. The inner wear surface 22 is located adjacent the bottom wear surface 16 of the recess of protective sleeve 14 and in sliding contact with bottom wear surface 16 of sleeve 14.

Liner 20 may be made of phenolic, bronze, steel, or brass, preferably, bronze. Liner 20 may be made of a unitary design or a split cylindrical design. Preferably, liner 20 is a split cylindrical shape, especially if the protective sleeve is in the form of a split cylindrical form.

Cartridge 26 is also of a cylindrical shape to be located in the recess of protective sleeve 14. It may be of a unitary cylindrical shape or, preferably, a split cylindrical form. Cartridge 26 includes an upper spherical surface 30 and a lower surface 31. The inner surface 31 of cartridge 26 is located adjacent outer surface 24 of liner 20. Cartridge 26 is detachably secured on its inner surface 31 to the outer surface 24 of liner 20. Any conventional manner of detachably securing cartridge 26 to liner 20 may be used, such as by fasteners 32.

Opposite sidewall surfaces 28 on cartridge 26 are arranged adjacent and in sliding contact with sidewall surfaces 18 of the recess and protective sleeve 14.

Cartridge 26 includes an upper surface 30, part of which is a spherical segment in the form of a convex surface. Upper surface 30 contacts with a mating concave surface 42 of pillow block 40.

Cartridge 26 may be made of cast steel, preferably, cartridge 26 is made of high strength low alloy steel.

Additional construction of bearing 10 includes the use of multiple thrust plate rings 34 located between sidewall wear surface 18 of the recess of protective sleeve 14 and opposite sidewall surfaces 28 of cartridge 26. At least one ring is detachably secured to each sidewall 18 of the recess in sleeve 14. The ring, preferably, is detachably secured to the protective sleeve by fasteners 36. Ring 34 includes one surface to be placed adjacent sidewall 18 of the recess and the opposite surface being wear resistant and to be in contact with sidewall surfaces 28 of cartridge 26. Thrust rings 34 may be made of bronze or brass, but preferably bronze.

Pillow block 40 is used to hold the bearing together in place on the journal 12 and may be clamped or fastened together in any conventional way (not shown). Pillow block 40 which may be made of cast steel or high strength low alloy steel, preferably has an inner concave surface 42 for mating contact with the outer spherical segment 30 of cartridge 26. Depending on the curvature of the mating surfaces, the arrangement of the pillow block and cartridge accommodates axial misalignments of the journal up to several degrees, preferably plus or minus 5 degrees.

An important feature of the present invention is the use of a plurality of high wear-resistant elements consisting essentially of high carbon fiber composites for providing high wear and low friction resistance. The composites provide a material with (1) a high load carrying capacity better than mild steel, and (2) an extremely low coefficient of friction. Preferably, these elements are in the shape of discs 44 as best shown in FIG. 2, however, the shape is not believed to be critical. Such discs 44 are placed into the wear surfaces of the bearing at a location of high or maximum loads in order to improve wear resistance and decrease friction. The objective is to place sufficient high wear-resistant elements in load-sensitive locations.

It has been found that a high carbon fiber composite suitable for this use is manufactured by Hycomp Inc. of Cleveland, Ohio, under the trade name "Wearcomp" material. It is believed that this material is a composite of polyimide and carbon fibers.

It has been found that only a small portion of the wear surfaces of the bearing need to have these high wear-resistant elements in order to provide the high wear resistance and low friction. As shown in FIG. 1, discs 44 may be press-fit into the wear surfaces of the bearing to be substantially even with the wear surface. Particularly, FIG. 1 shows that liner 20 includes cutout areas on the inner wear surface 22 in order to press-fit discs 44 into that surface. Likewise, thrust rings 34 can be provided with cutout areas in order to permit discs 44 to be press-fit into the wear-resistant surface adjacent cartridge 26.

Further, it has been found that discs 44 do not need to have spherical or curved surfaces, but instead are provided with a flat surface 46, as shown in FIG. 2. Such a flat surface facilitates a less costly manufacturing operation to produce discs 44 and easier assembly of the component parts for bearing 10, while providing excellent wear resistance and low friction contact with opposing surfaces.

The size and number of discs 44 to be located in a wear surface will depend on the application and bearing loads. For an AOD trunnion ring drive side bearing, disc 44 may be on the order of 1 inch (2.54 cm) in diameter. The surface coverage may range up to 30%, preferably 10-20%, of the total bearing surface area.

As shown in FIG. 1, the assembly of bearing 10 may include the use of shims 38 inserted between thrust rings 44 and sidewall surface 18 of the recess of protective sleeve 14. The use of shims 38 is optional, but may aid in the assembly of bearing 10 in order to achieve a contacting fit with cartridge 26 within the recess of protective sleeve 14.

It has been found that the spherical plain bearing 10 of the present invention is particularly useful for the trunnion ring drive side bearing of an AOD vessel. The spherical plain bearing of the present invention has provided unexpectedly long-life wear resistance showing superior results to conventional spherical roller bearings used for the same trunnion ring drive side bearing.

The spherical plain bearing of the present invention will require lubrication in a conventional manner. Furthermore, bearing 10 is useful with other conventional features not described, such as water-cooled trunnion rings, and seals to prevent contaminants from invading the bearing moving parts.

An advantage of the bearing of the present invention is that it is less costly to manufacture because of the flat wear surface of discs 44 and the simplicity of design compared to prior art spherical designs. The bearing is also more easily removed and replaced because of the split shell fastening design.

Although preferred and alternative embodiments have been described, it will be apparent to one skilled in the art that changes can be made therein without departing from the scope of the invention.

What is claimed is:

1. A spherical plain bearing having improved wear resistance under heavy axial and radial loads of a rotating shaft, the bearing comprising:

(a) a pillow block having a concave inner surface;

(b) a cylindrical protective sleeve for mating with and detachably clamping around the shaft, the outer surface of the sleeve having a peripheral recess defined by two sidewall wear surfaces and a bottom wear surface;

(c) a cylindrical liner having an inner wear resistant surface for sliding contact with the bottom wear surface of the recess in the sleeve, the liner located within the recess of the sleeve;

(d) multiple thrust plate rings, at least one ring being detachably secured to each sidewall of the recess in the sleeve, the ring having a wear resistant surface opposite the surface adjacent the sidewall of the recess;

(e) a cylindrical cartridge detachably secured on its inner surface to the liner located in the recess of the sleeve, the cartridge outer surface being a spherical segment to mate with the concave surface of the pillow block, the cartridge having opposite side surfaces each being in sliding contact with the exposed wear surface of the thrust plate ring; and (f) a plurality of high wear-resistant elements consisting essentially of high carbon fiber composites for providing high wear and low friction resistance being press-fit into the wear surfaces of the bearing.

2. The bearing of claim 1 wherein the composite elements are press-fit into the inner wear surface of the liner.

3. The bearing of claim 1 wherein the composite elements are press-fit into the wear surface of the thrust plate ring.

4. The bearing of claim 1 wherein the composite elements are disc-shaped.

5. The bearing of claim 1 wherein the liner is made of a material selected from the group of phenolic, bronze, steel, and brass.

6. The bearing of claim 1 wherein the thrust plate ring is made of a material selected from the group of bronze and brass.

7. The bearing of claim 1 wherein the composite elements have flat surfaces for sliding contact.

8. A spherical plain bearing having improved wear resistance under heavy axial and radial loads of a rotating shaft, the bearing comprising:

(a) a pillow block having a concave inner surface;

(b) a split cylindrical protective sleeve for mating with and detachably clamping around the shaft, the outer surface of the sleeve having a peripheral recess defined by two sidewall wear surfaces and a bottom wear surface;

(c) a split cylindrical liner having an inner wear resistant surface for sliding contact with the bottom wear surface of the recess in the sleeve, the liner located within the recess of the sleeve and made of a material selected from the group of phenolic, bronze, steel, and brass;

(d) multiple thrust plate rings, at least one ring being detachably secured to each sidewall of the recess in the sleeve, the ring having a wear resistant surface opposite the surface adjacent the sidewall of the recess, the ring made of a material selected from the group of bronze and brass;

(e) a split cylindrical cartridge detachably secured on its inner surface to the liner located in the recess of the sleeve, the cartridge outer surface being a spherical segment to mate with the concave surface of the pillow block, the cartridge having opposite side surfaces each being in sliding contact with the exposed wear surface of the thrust plate ring; and (f) a plurality of high wear-resistant disc-shaped elements having flat surfaces for sliding contact, the elements consisting essentially of high carbon fiber composites for providing high wear and low friction resistance being press-fit into the wear surfaces of the liner and plate rings.

* * * * *